United States Patent
Douglas et al.

(10) Patent No.: US 11,798,010 B2
(45) Date of Patent: Oct. 24, 2023

(54) DATABASE MANAGEMENT SYSTEMS AND METHODS USING DATA NORMALIZATION AND DEFRAGMENTATION TECHNIQUES

(71) Applicant: Maystreet, Inc., New York, NY (US)

(72) Inventors: Niall Douglas, Kerry Pike (IE); Robert Leahy, New York, NY (US); Michael Lehr, New York, NY (US)

(73) Assignee: MAYSTREET INC., New York, NY (US)

(*) Notice: Subject to any disclaimer, the term of this patent is extended or adjusted under 35 U.S.C. 154(b) by 484 days.

(21) Appl. No.: 16/986,646

(22) Filed: Aug. 6, 2020

(65) Prior Publication Data
US 2022/0044259 A1 Feb. 10, 2022

(51) Int. Cl.
*G06Q 30/0201* (2023.01)
*G06F 16/17* (2019.01)
*G06F 16/11* (2019.01)
*G06F 16/178* (2019.01)

(52) U.S. Cl.
CPC ....... *G06Q 30/0201* (2013.01); *G06F 16/113* (2019.01); *G06F 16/128* (2019.01); *G06F 16/178* (2019.01); *G06F 16/1724* (2019.01)

(58) Field of Classification Search
CPC .................................................. G06Q 30/0201
See application file for complete search history.

(56) References Cited

U.S. PATENT DOCUMENTS 7,921,046 B2* 4/2011 Parsons ............... G06Q 40/00
705/35
9,990,393 B2* 6/2018 Parsons ............... H04L 45/72
10,121,196 B2* 11/2018 Parsons ............... G06Q 40/04
(Continued)

OTHER PUBLICATIONS

Nayak et al, Impact of Data Normalization on Stock Index Forecasting, International Journal of Computer Information Systems and Industrial Management Applications. ISSN 2150-7988 vol. 6 (2014) pp. 257-269 (Year: 2014).*

(Continued)

*Primary Examiner* — Andre D Boyce
(74) *Attorney, Agent, or Firm* — Pillsbury Winthrop Shaw Pittman, LLP

(57) ABSTRACT

Improved systems and methods for database management using data normalization and defragmentation techniques are provided. At least one exchange processor in communication with an exchange computer system receives market data from the exchange computer system, processes the market information, and transmits the market data to a master processor. The master processor receives the market data, processes the data using at least one normalization process to generate normalized data including an intra-day file and an archival file, and stores the intra-day file and the archival file in the master database. The master processor transmits the intra-day file and the archival file to the at least one regional processor. The regional processor receives a request for information from a customer computer system in communication with the regional processor, queries the intra-day file and the archival file to identify matching market data in response to the request, and transmits the matching market data to the customer computer system.

26 Claims, 10 Drawing Sheets

(56) References Cited

U.S. PATENT DOCUMENTS

| | | | | |
|---|---|---|---|---|
| 2008/0243675 | A1* | 10/2008 | Parsons | G06Q 40/06 705/37 |
| 2012/0150765 | A1* | 6/2012 | Leven | G06Q 40/06 705/37 |
| 2013/0346274 | A1 | 12/2013 | Ferdinand et al. | |
| 2015/0127513 | A1 | 5/2015 | Studnitzer et al. | |
| 2019/0068483 | A1 | 2/2019 | Loveless | |
| 2020/0380353 | A1* | 12/2020 | Ding | G06N 3/08 |
| 2022/0237673 | A1* | 7/2022 | Muthraja | G06Q 20/383 |

OTHER PUBLICATIONS

Keogh et al, On the Need for Time Series Data Mining Benchmarks: A Survey and Empirical Demonstration, KDD '02: Proceedings of the eighth ACM SIGKDD international conference on Knowledge discovery and data mining, Jul. 2002, pp. 102-111 (Year: 2002).*

International Search Report of the International Searching Authority dated Nov. 15, 2021, issued in connection with International Application No. PCT/US2021/44606 (3 pages).

Written Opinion of the International Searching Authority dated Nov. 15, 2021, issued in connection with International Application No. PCT/US2021/44606 (9 pages).

\* cited by examiner

US 11,798,010 B2

DATABASE MANAGEMENT SYSTEMS AND METHODS USING DATA NORMALIZATION AND DEFRAGMENTATION TECHNIQUES

BACKGROUND

Technical Field

The present disclosure relates generally to the field of computer database management systems and methods. More specifically, the present disclosure relates to improved database management systems and methods using data normalization and defragmentation.

Related Art

Database management systems are a critical part of today's computing technology. Database management systems of various designs exist, such as relational databases, columnar databases, object databases, and other types of databases. Additionally, databases can be distributed across multiple computing systems/platforms, and are scalable to accommodate various data requirements.

In the field of financial information processing and technology, database management systems are of critical importance in storing and managing financial data, often in real time. For example, the various stock exchanges of the United States and other countries (e.g., the New York Stock Exchange (NYSE)) each maintain sophisticated computer systems and associated database management systems which store live (and historical) stock market and exchange data. Each of these systems utilizes proprietary data formats and database management functions.

Due to the highly proprietary nature of each exchange's computer systems and database management systems/technology, it is difficult to rapidly and efficiently search for desired financial data (e.g., stock data, market data, etc.) across multiple exchanges. Accordingly, what would be desirable, but has not yet been provided, are improved database management systems and methods using data normalization and defragmentation techniques, which solve the foregoing and other needs.

SUMMARY

The present disclosure relates to improved systems and methods for database management using data normalization and defragmentation techniques. The system includes at least one exchange processor in communication with an exchange computer system, a master processor in communication with the at least one exchange processor, and at least one regional processor in communication with the master processor. The at least one exchange processor receives market data from the exchange computer system, processes the market information, and transmits the market data to the master processor. The master processor receives the market data, processes the data using at least one normalization process to generate normalized data including an intra-day file and an archival file, and stores the intra-day file and the archival file in the master database. The master processor transmits the intra-day file and the archival file to the at least one regional processor, which stores the intra-day file and the archival file in a regional database. The regional processor receives a request for information from a customer computer system in communication with the regional processor, queries the intra-day file and the archival file to identify matching market data in response to the request, and transmits the matching market data to the customer computer system.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to improved database management systems and methods, as described in detail below in connection with FIGS. 1-10.

Figure 1:
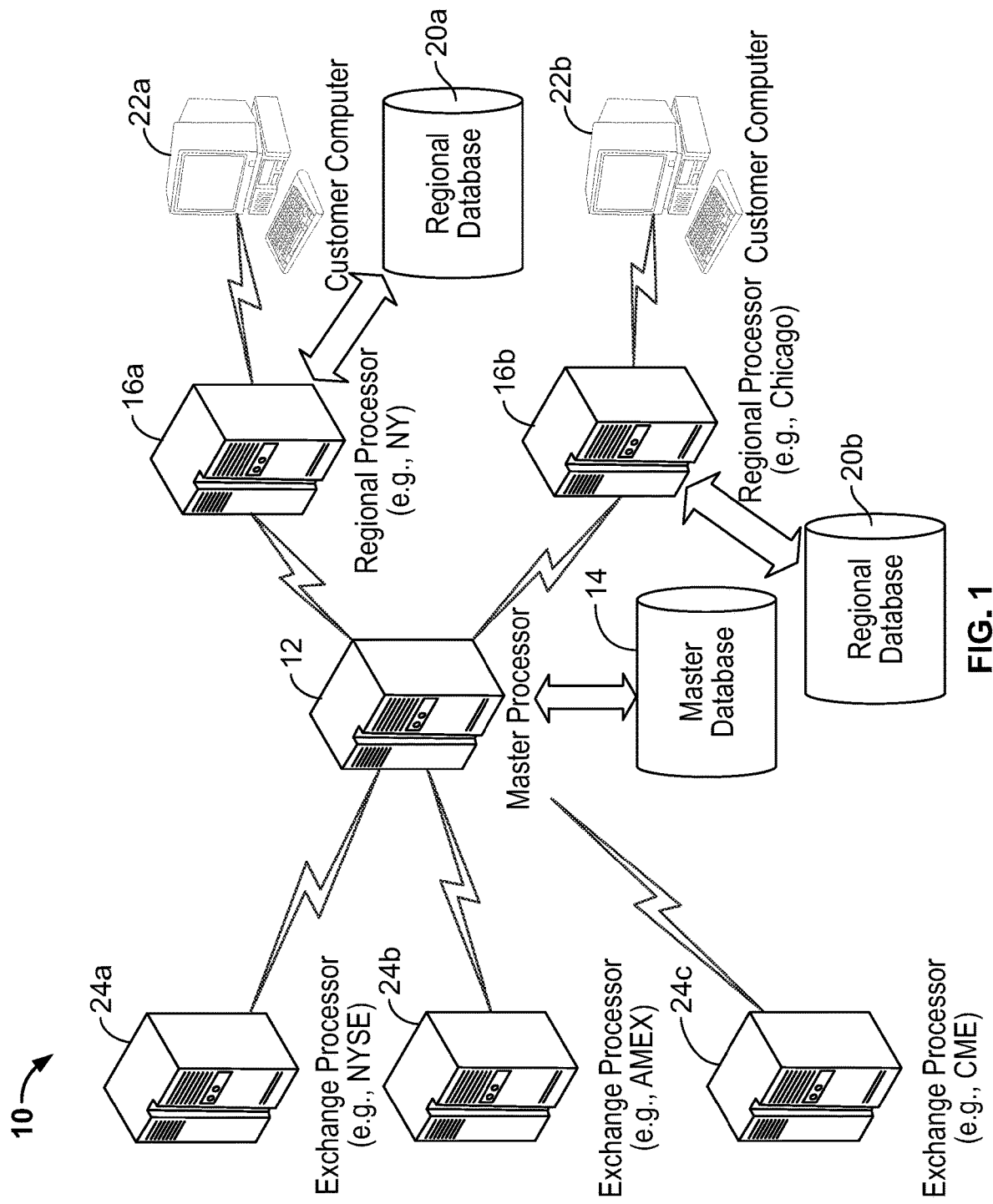
FIG. 1 is a diagram illustrating the system of the present disclosure.

FIG. 1 is a diagram illustrating the system of the present disclosure, indicated generally at 10. The system 10 includes a master processor 12, a master database 14 in communication with the master processor 12, one or more regional processors 16a-16b in communication with the master processor, and one or more regional databases 20a-20b in communication with the regional processors 16a-16b. The regional processors 16a-16b are in communication with one or more customer computer systems 22a-22b, and the master processor is in communication with one or more exchange processors 24a-24c. As will be discussed in greater detail below, the system 10 aggregates financial market data from the one or more exchange processors 24a-24c, processes the data using a normalization engine that normalizes the data in a format that allows for very rapid searching of desired market data, and communicates the normalized data to the one or more regional processors 16a-16b for subsequent searching by users of the customer computers 22a-22b. Advantageously, in addition to allowing for very rapid searching of desired market data, the system 10 of the present disclosure allows market data stored in incompatible data formats by various financial exchanges (e.g., the New York Stock Exchange (NYSE), the American Stock Exchange (AMEX), etc.) to be rapidly, accessed, searched, and analyzed using a single platform accessible by users.

The master processor 12 and the regional processors 16a-16b could be implemented using a wide variety of computer hardware, such as individual servers, groups of servers (server farms), could computing platforms, or other suitable computing devices, running suitable operating systems (e.g., LINUX, UNIX, etc.). The customer computers 22a-22b could be any suitable computing system capable of accessing the regional processors 16a-16b, such as personal computers, tablet computers, smart phones, etc. The exchange processors 24a-24c are customized processors that are in communication with one or more exchange data systems (and, optionally, located at the same physical location as such data systems) and which include customized software and hardware components for rapidly (e.g., in real time) aggregating market data from the one or more exchanges and transmitting such information to the master processor 12 for normalization by the master processor. As will be discussed in greater detail below, the master database 14 and the regional databases 20a-20b are customized databases with built-in features that allow for very rapid searching of market data by users of the system. Although specific processors are shown in FIG. 1, it is to be understood that other configurations are possible. For example, the functions of the master processor 12, the regional processors 16a-16b, and the exchange processors 24a-24c could be combined into one or more hardware devices/platforms, if desired.

Figure 2:
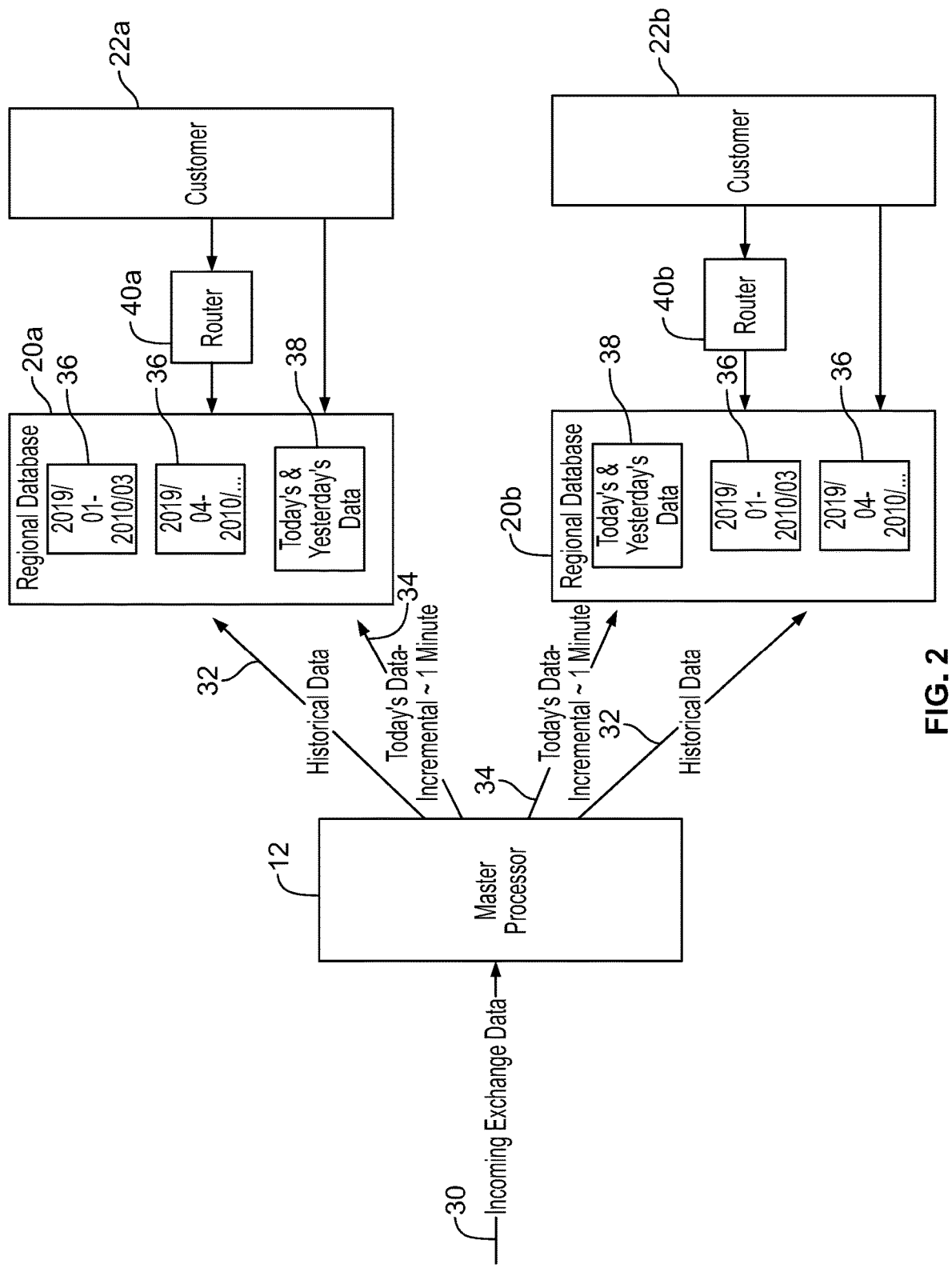
FIG. 2 is a diagram illustrating the system of FIG. 1 in greater detail.

FIG. 2 is a diagram illustrating the system 10 of FIG. 1 in greater detail. The master processor 12 receives incoming exchange data 30 from the one or more exchange processors 24a-24c. The incoming exchange data 30 could be transmitted to the master processor 12 in real time, or periodically. The master processor 12 executes a normalization engine (e.g., computer-readable software instructions stored on an executed by the master processor 12), discussed below, which processes the incoming data 30 in the manner discussed herein, aggregating the data 30 and storing it in a customized format that allows for very rapid searching of desired market data by the customers 22a-22b across multiple exchanges. Specifically, the normalization engine of the master processor 12 generates historical data 32 and incremental data 34 from the incoming exchange data, and transmits the historical data 32 and the incremental data 34 to the regional processors 16a-16b for storage in the regional databases 20a-20b. Specifically, the historical data 32 is stored in one or more historical data files 36 of the databases 20a-20b, and the incremental data 34 is stored in one or more incremental data files 38 of the databases 20a-20b. Additionally, the historical data 32 and the incremental data 34 is stored in the master database 14 of the master processor 12, so that the historical data 32 and incremental data 34 can be quickly replicated and stored in additional regional databases, and distributed thereto. Advantageously, in the event that one or more of the regional databases 20a-20b is corrupted, offline, or requires maintenance or repair, such databases can be automatically updated/re-loaded by the master processor 12 as needed. The historical data files 36 and the incremental data files 38 can be accessed by the customer computer systems 22a-22b via one or more routers 40a-40b, or directly by the customers 22a-22b.

Figure 3:
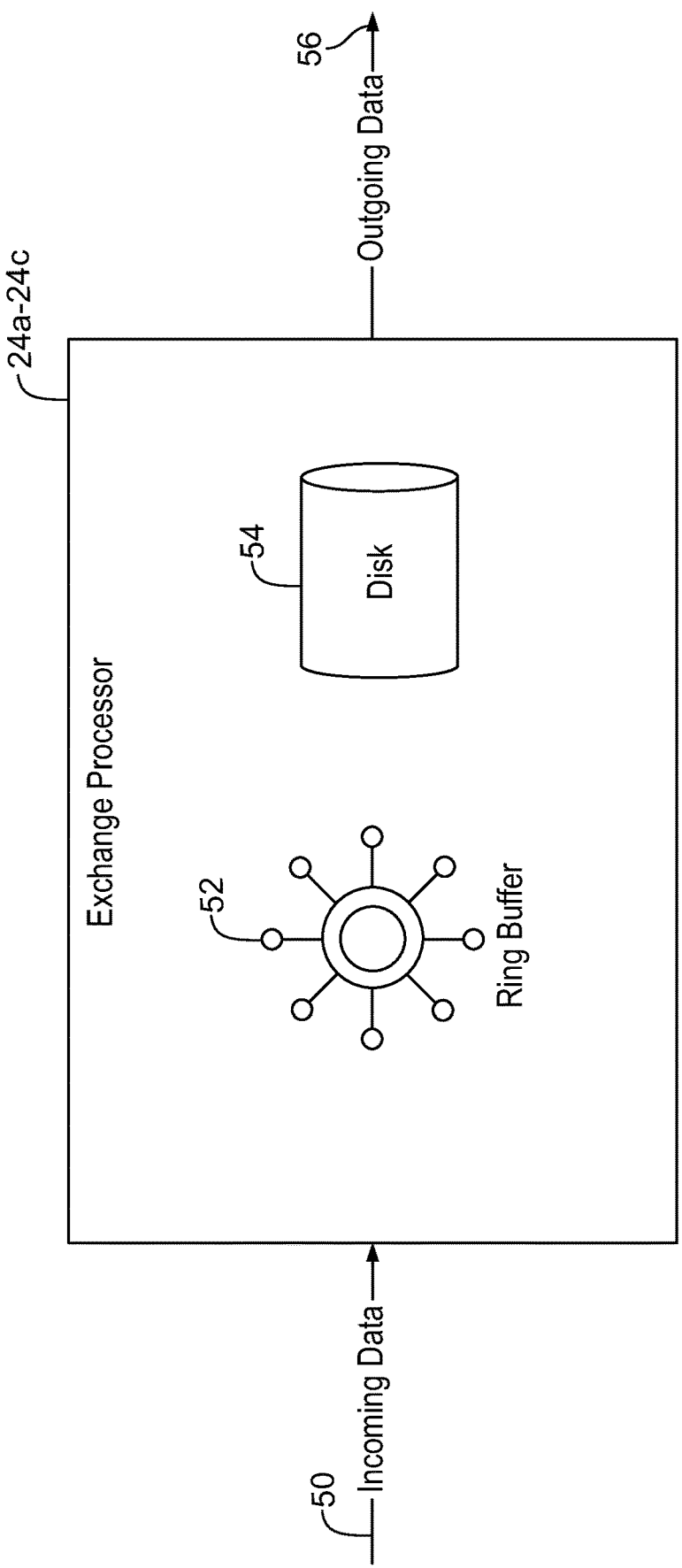
FIG. 3 is diagram illustrating components of the exchange processor of the present disclosure in greater detail.

FIG. 3 is diagram illustrating components of the exchange processors 24a-24c of the present disclosure in greater detail. The exchange processors 24a-24c are in communication with one or more computer systems operated by an exchange (e.g., the New York Stock Exchange, etc.), and receive incoming data 50 from such computer systems relating to market information, in real time. Advantageously, the processors 24a-24c each include a ring buffer 52 for storing the incoming data 50 temporarily, and disk storage 54 for also storing the incoming data, so that the processors 24a-24c allow for the lossless capture of packets of data from the exchange computer systems. The captured information can transmitted by the ring buffer 52 and/or the disk storage 54 as outgoing data 56 to the master processor 12, as fast, live streaming data supplied to the master processor 12. Additionally, it is noted that the processors 24a-24c could be located at the same physical location as (co-located with) the computer systems of the exchanges, so as to reduce latency in communications between the processors 24a-24c and the computer systems of the exchanges.

Figure 4:
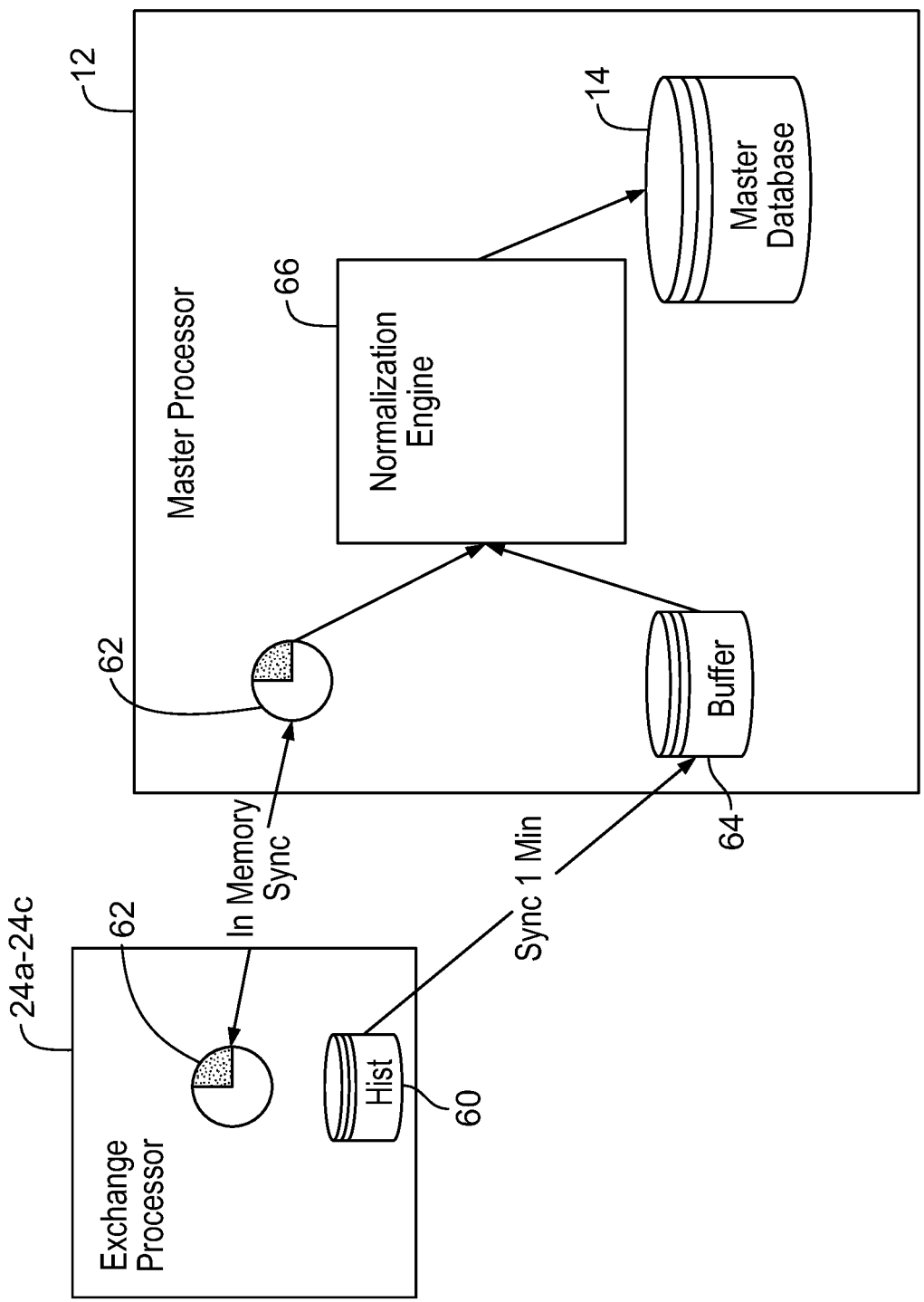
FIG. 4 is a diagram illustrating in-memory synchronization carried out between one or more of the exchange processors and the master processor of the present disclosure.

FIG. 4 is a diagram illustrating in-memory synchronization carried out between one or more of the exchange processors 24a-24c and the master processor 12 of the present disclosure. The exchange processors 24a-24c each include a historical database 60, which stores historical market information gathered by the processors 24a-24c. The database 60 is synchronized with a buffer database 64 of the master processor 12 periodically, e.g., once every minute. Of course, other intervals and frequencies of synchronization are possible. Additionally, both the exchange processors 24a-24c and the master processor 12 perform an in-memory synchronization procedure 62, such that in-memory contents of the exchange processors 24a-24c are synchronized with the normalization engine 66 of the master processor 66. Additionally, the normalization engine 66 of the master processor 12 can access the buffer database 64 in order to obtain information from the exchange processors 24a-24c. As will be discussed in greater detail below, the normalization engine 66 performs one or more normalization functions on the information supplied by the exchange processors 24a-24c, so as to increase the speed with which desired market data can be obtained by a user of the system. Results of such normalization are stored in the master database 14, and as noted above in connection with FIGS. 1-2, the master database 14 can periodically update the regional databases 20a-20b of the regional processors 16a-16b.

Figure 5A:
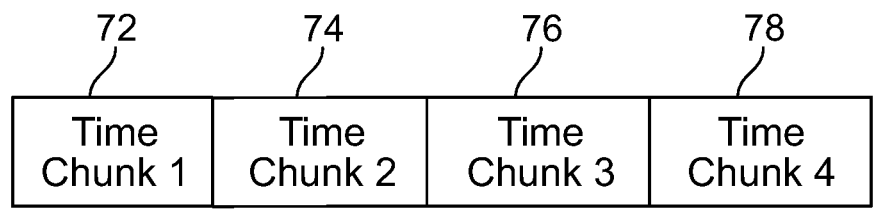
FIGS. 5A-5B are diagrams illustrating intra-day and archival file formats, respectively, in accordance with the present disclosure.
Figure 5B:
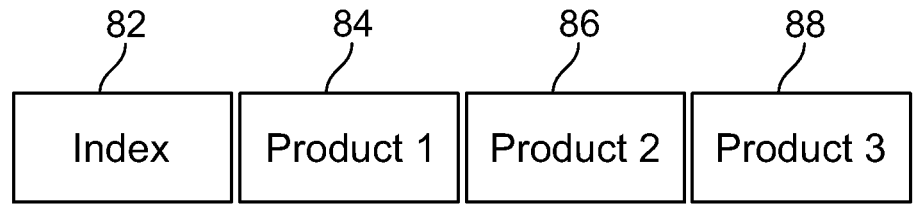

FIGS. 5A-5B are diagrams illustrating intra-day and archival file formats, respectively, in accordance with the present disclosure. As shown in FIG. 5A, the intra-day file 70 includes market data stored in a plurality of time chunks 72-78. Specifically, the intra-day file 70 can be appended to in time chunks of a pre-defined duration (e.g., 5 minutes), and includes a time index based on the chunk. Market data for financial products (e.g., stock values for a particular company, for example) is indexed in each chunk, and can be very easily and rapidly retrieved from the intra-day file 70 by specifying a desired time and a desired financial product (e.g., all values of the stock of Apple, Inc. from 9:30 AM through 10:00 AM on a given day). As shown in FIG. 5B, the archival file 80 includes an index field 82 and a plurality of data fields 84-88 relating to specific financial products. For example, the index field 82 could identify a particular exchange (e.g., the NYSE), the data field 84 could include time-sequenced stock values for Apple, Inc., the data field 86 could include time-sequenced stock values for IBM Corporation, etc. Advantageously, data in the archival file 80 is "defragmented" from the intra-day file 70 and organized by financial product, and the defragmentation process allows the data in the archival file 80 to be very rapidly searched through and accessed by users of the system. Such a feature greatly improves the functioning of the system by increasing the speed with which data can be accessed by users, saving tremendous processing time.

Figure 6:
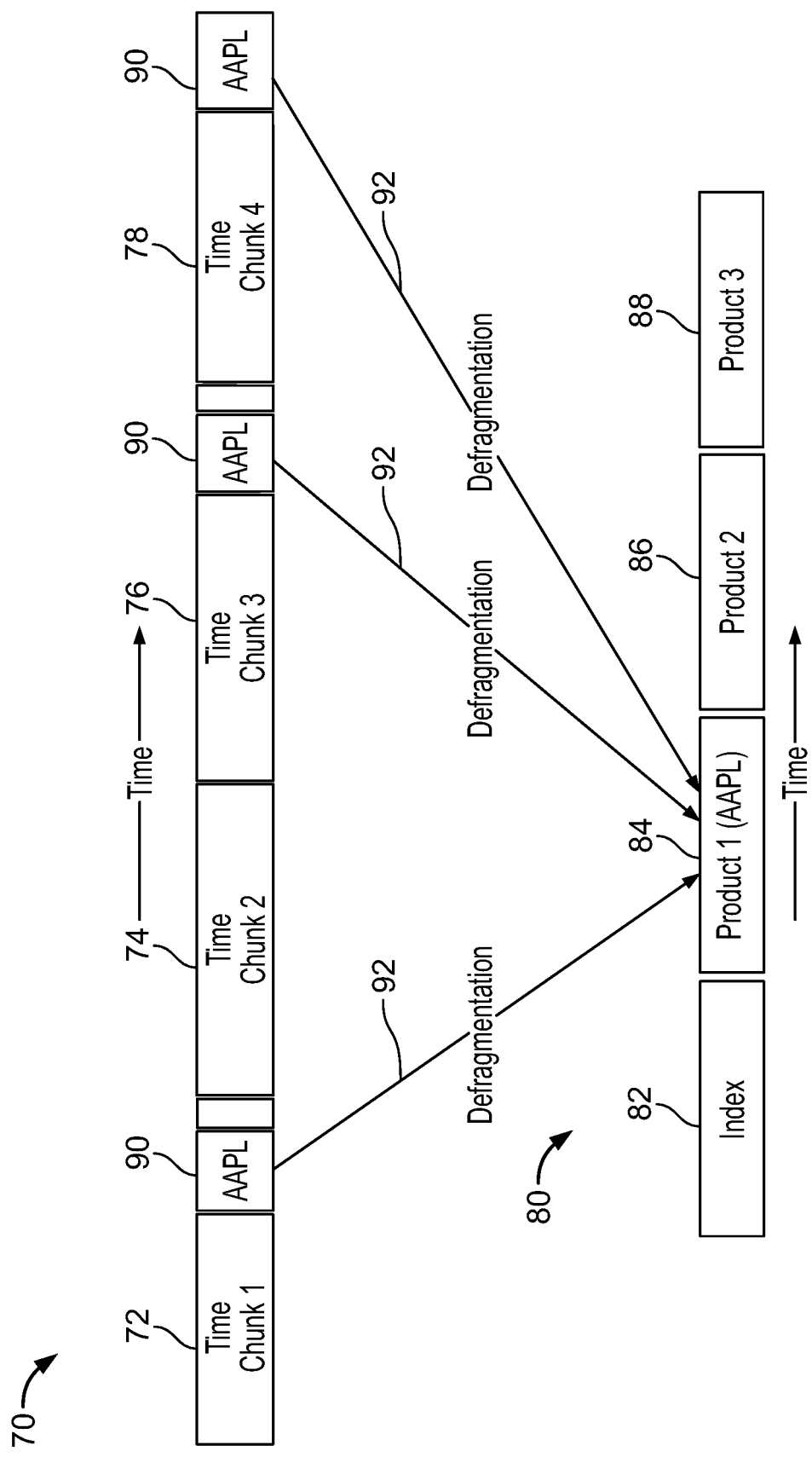
FIG. 6 is a diagram illustrating defragmentation processes carried out by the present disclosure.

FIG. 6 is a diagram illustrating the defragmentation process discussed above in connection with FIG. 5B, in greater detail. As can be seen, the intra-day file 70 includes (for illustration purposes only) four time chunks 72-78, labelled Time Chunks 1-4, respectively. Time chunks 72, 76, and 78 (Chunks 1, 3, and 4) include stock values for various stocks, including values 90 which indicate the stock values of Apple, Inc. (labelled "AAPL") at various points during a day. Time chunk 74 (Chunk 2), however, does not include stock values for Apple, Inc. Accordingly, the market data for Apple is fragmented because it is spread across the intra-day file 70. A defragmentation process 92 is applied to the intra-day file 70 to create the archival file 80. For example, the defragmentation process 92 gathers all of the stock values 90 (for Apple, Inc.), sorts the stock values 90 in time sequence, and stores the stock values 90 in the data field 84 of the archival file 80. As a result, the data field 84 includes only stock values corresponding to Apple, Inc., stored in time sequence. The contents of the data field 84 (the time-sequenced stock values 90) could be linked to each other using a reversed link list or other suitable data structures. By performing this defragmentation, the stock values of Apple, Inc. can be very rapidly accessed by a user of the system since the system does not need to search through fragmented data to find all of the relevant information (which requires increased processor time to perform). The data fields 86 and 88 can be similarly created from the intra-day file 70, and can store time-sequenced stock information relating to other companies. The normalization engine 66 discussed above carries out the processes for creating the intra-day file 70 and the archival file 80, including the defragmentation processes discussed herein.

Figure 7:
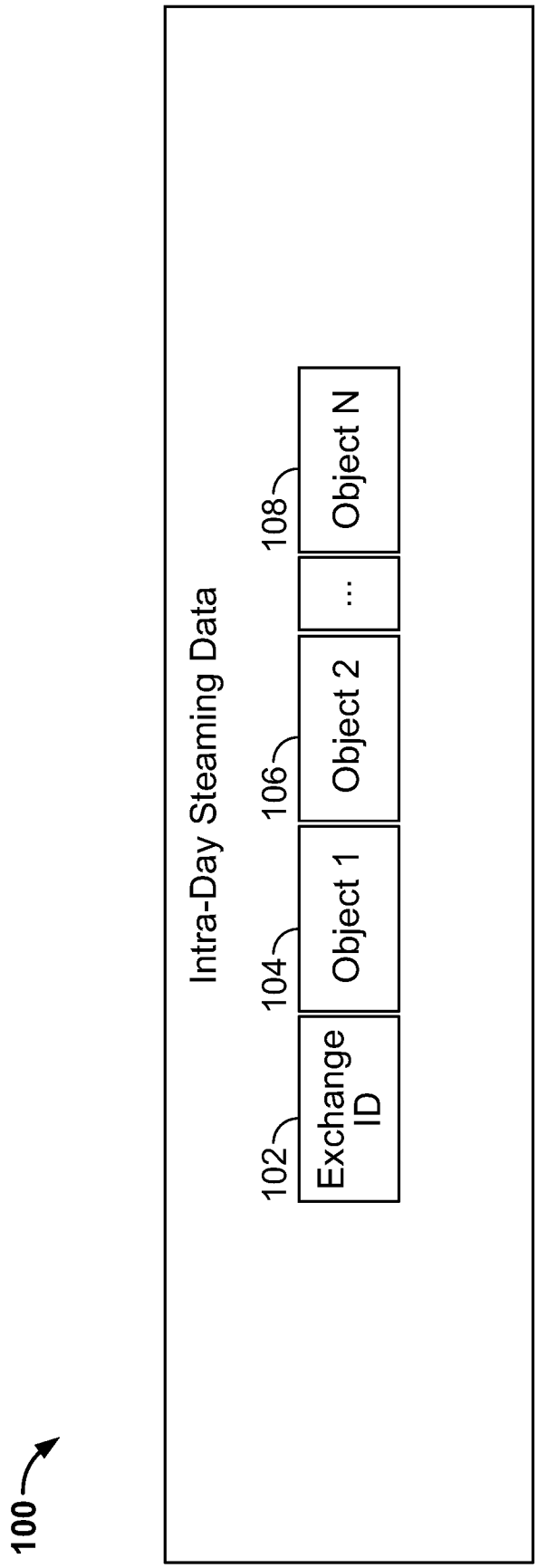
FIG. 7 is a diagram illustrating an intra-day streaming file format in accordance with the present disclosure.

FIG. 7 is a diagram illustrating an intra-day streaming file in accordance with the present disclosure, indicated generally at 100. As noted earlier in connection with FIG. 4, each of the exchange processors 24a-24c can "stream" data from an exchange to the master processor 12. Such streaming exchange data can be stored in the streaming file 100, which includes an exchange identification field 102 and one or more object fields 104-108 (labeled Objects 1-N). Advantageously, the object fields 104-108 can be objects that are similar to object-oriented programming objects, and can have both generic data as well as specific data within each object. Examples of generic data include, but are not limited to, add order prices, quantities, and product names, and examples of specific data include, but are not limited to, customized trade flags, internal timestamps, order priority, customer bid/ask quantities, and exchange identifiers. The file 100 could be stored in a "top-of-book" configuration, if desired, and such configuration could be created by the normalization engine 66 of the present disclosure.

Figure 8:
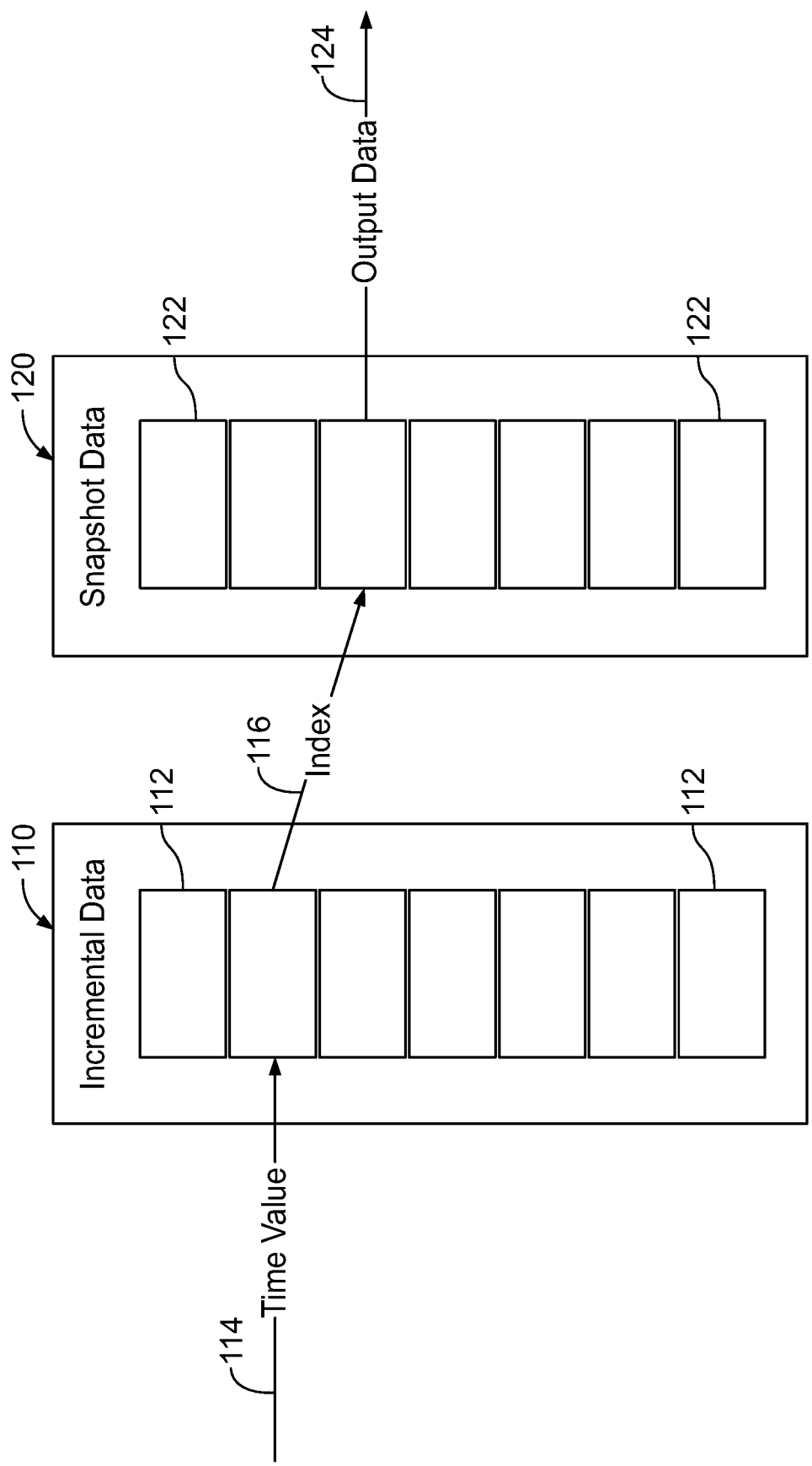
FIG. 8 is a diagram illustrating incremental data and snapshot data files in accordance with the present disclosure.

FIG. 8 is a diagram illustrating incremental data and snapshot data files in accordance with the present disclosure. Another possible configuration of information is a "depth-of-book" configuration, which can also be created by the normalization engine 66 of the present disclosure. In such a configuration, an incremental data file 110 is created as well as a snapshot data file 120. The files 110 and 120 are "column" or "columnar" database files. The incremental data file 110 includes sequenced time values 112, and the snapshot data file 120 includes market values that serve as snapshots of market values at various times throughout a day. The structure of the files 110 and 120 allow for very rapid identification of relevant market data using time values and product identifiers (e.g., Apple stock) as indexes to the data. To obtain relevant data, a time value 114 is used as a first lookup (index) into the incremental data file 110. Once a matching time value is located in the incremental data file 110, a corresponding index 116 is retrieved from the incremental data file 110 and then used to rapidly locate corresponding stock data from the snapshot file 120. Once the corresponding data is located, it is then provided by the system as output data 124.

Figure 9:
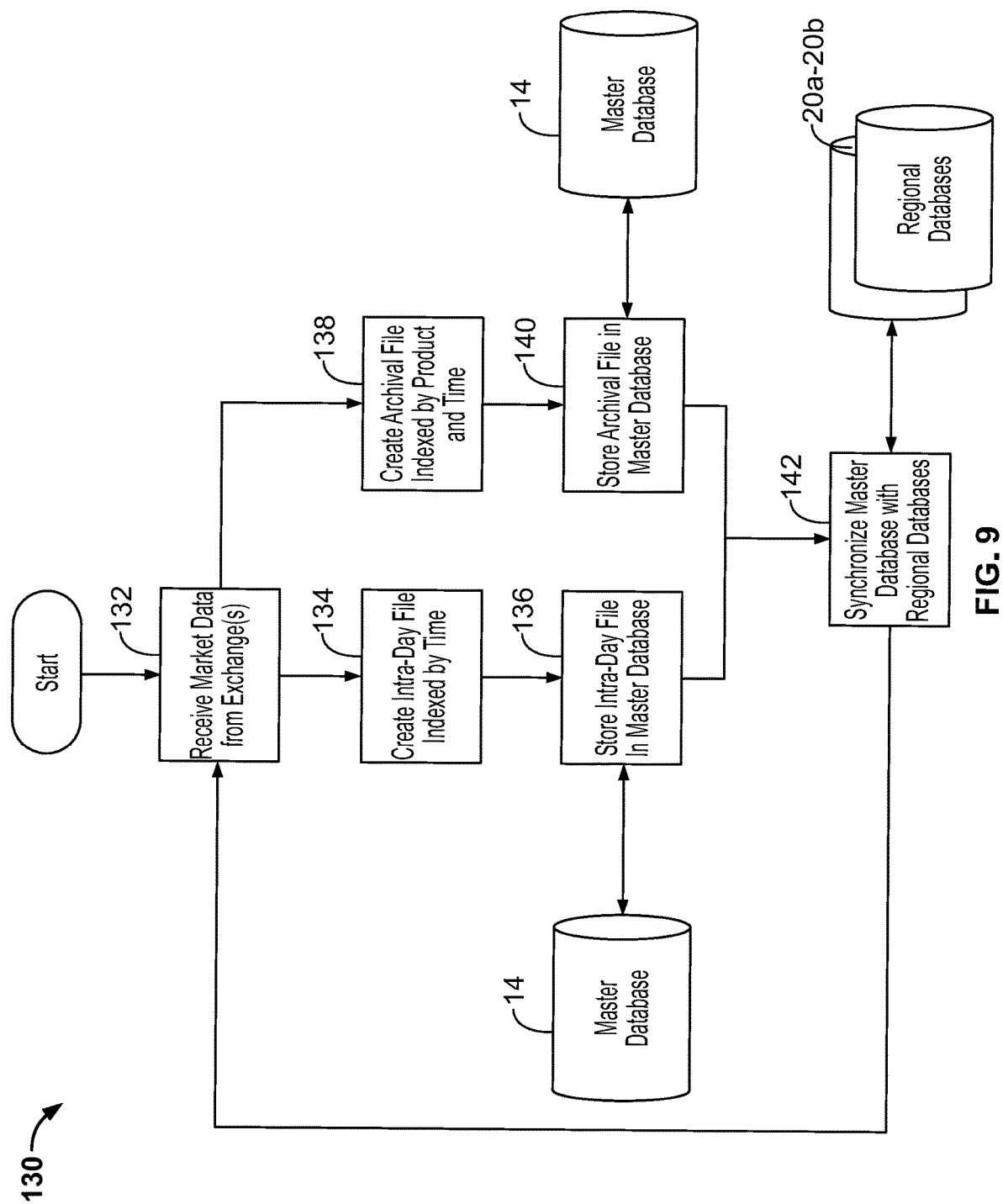
FIG. 9 is a flowchart illustrating process steps carried out by the normalization engine of the present disclosure.

FIG. 9 is a flowchart illustrating process steps carried out by the normalization engine 66 of the present disclosure, indicated generally at 130, for normalizing market data gathered by the one or more exchange processors 24a-24b and transmitted to the master processor 12. In step 132, the market data is received by the master processor 12 from the one or more exchange processors 24a-24b. It is noted that the master processor 12 could receive the market data directly from one or more exchange computer systems directly (e.g., without using the exchange processors 24a-24b), if desired. In step 134, the normalization engine 66 creates intra-day files indexed by time using the market data. Additionally, in step 138, the normalization engine 66 creates archival files indexed by product and by time, using the market data. The intra-day and archival files could have the formats discussed above in connection with FIGS. 5A-7. In steps 136 and 140, the intra-day and archival files are stored in the master database 14. In step 142, the normalization engine 66 synchronizes the master database 14 (including the intra-day and archival files) with the one or more regional databases 20a-20b, such that relevant information in the regional databases 20a-20b matches the content of the master database 12. Such synchronization could occur at any time interval (e.g., once every few minutes, once per hour, once per day, etc.), or continuously in real time. Control then returns to step 132 and the process 130 of FIG. 9 repeated.

Figure 10:
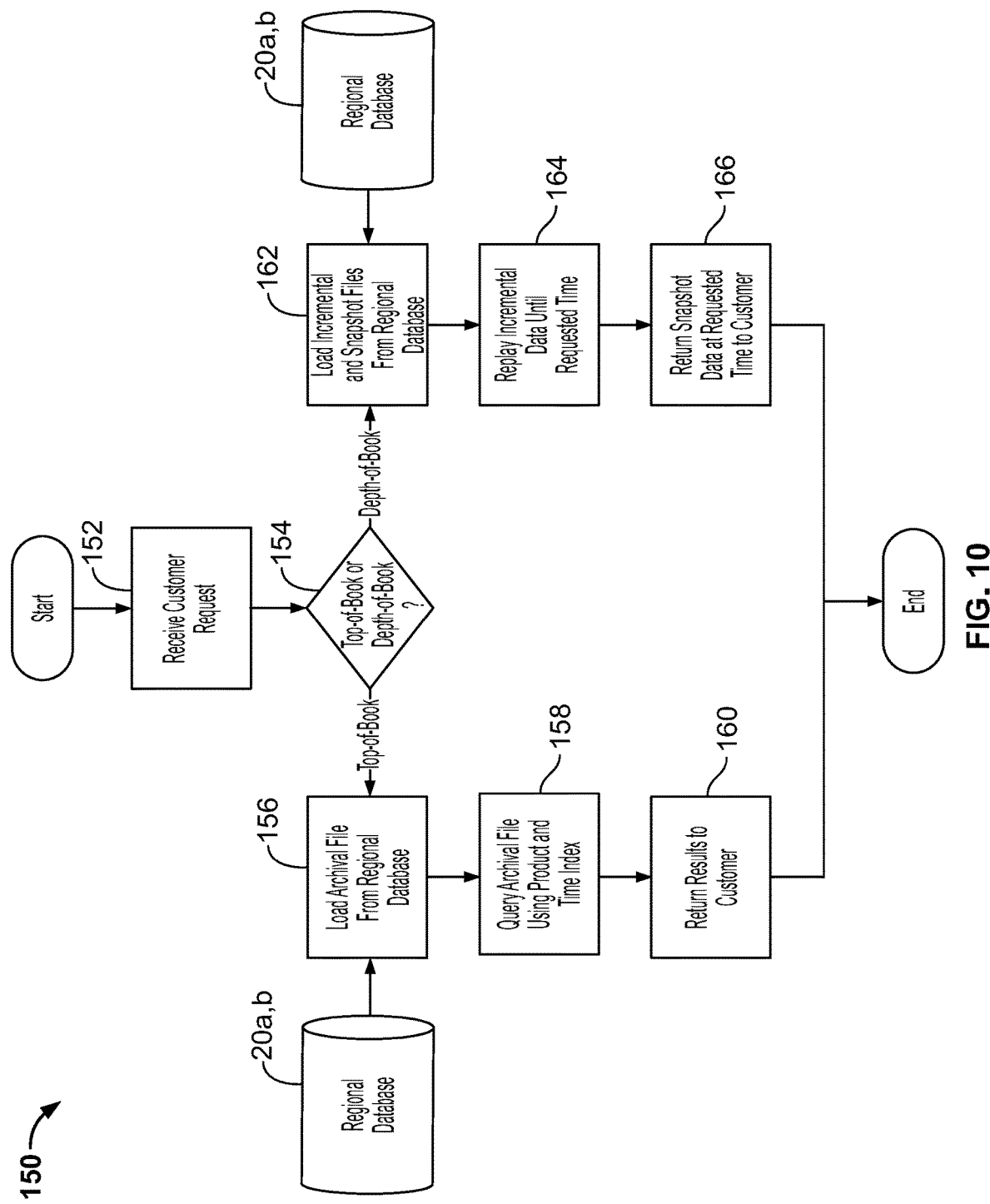
FIG. 10 is a flowchart illustrating process steps carried out by the regional processor of the present disclosure.

FIG. 10 is a flowchart illustrating process steps carried out by the regional processors 16a-16b of the present disclosure, indicated generally at 150. The processing steps 150 handle requests from customers to search for and identify desired market information, which can be presented in or more desired formats, such as top-of-book, depth-of-book, or other desired formats (e.g., level base). In step 152, a regional processor receives a customer request. In step 154, a determination is made as to whether the user desires a top-of-book or depth-of-book presentation of information. If a top-of-book presentation is required, step 156 occurs, wherein the regional processor loads an archival file (e.g., in the format described above in connection with FIGS. 5A-7) from one of the regional databases 20a-20b. Next, in step 158, the regional processor queries the archival file using a product identifier specified by the customer (e.g., AAPL for Apple, Inc. stock) and a desired time index (e.g., a desired time of day or range of times). As noted above, due to the format of the archival file, the query is performed very rapidly and with low computational overhead. Then, in step 160, the results of the query are presented to the customer.

In the event that the user desires a depth-of-book presentation of information, step 162 occurs, wherein the regional processor loads incremental and snapshot files (such as the files discussed above in connection with FIG. 8) from one of the regional databases 20a-20b. Then, in step 164, the regional processor replays the incremental data until a requested time (specified by the customer) is reached. In step 166, when the requested time is reached, the system locates snapshot data from the snapshot file corresponding to the time (in the manner discussed above in connection with FIG. 8), and returns the snapshot data to the customer. Due to the structure of the incremental and snapshot files of the system of the present disclosure, including the internal indexing mechanisms of such files (as discussed above in connection with FIG. 8), the system can very rapidly provide the snapshot data in response to customer requests, with low computational overhead.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. An improved database management system, comprising: at least one master processor programmed to:
   receive, over a period of time, a plurality of market data updates, each market data update from among the plurality of market data updates comprising a product identifier, a data value of a product identified by the product identifier, and a time value for which the data value relates;
   generate an intra-day file comprising a plurality of time chunks, each time chunk indexed by time and corresponding to an interval of time;
   assign each product identifier, data value, and time value from the market data updates to a respective time chunk based on the time value and the interval of time, wherein the intra-day file is fragmented with respect to a given product because data values for the given product is spread out over multiple time chunks, but the intra-day file is queryable based on a time index of each time chunk; and
   defragment the intra-day file to generate an archival file comprising a plurality of product fields that are indexed by a source of a market data update, wherein each product field from among the plurality of product fields includes a time-series of data values for a respective product, and wherein to defragment the intra-day file, the processor is programmed to:
      group product identifiers and their respective values from the intra-day file into a time series of data values; and
      assign each of the groups into a respective data record.

2. The system of claim 1, further comprising at least one exchange processor, associated with a source of one or more market data updates, in communication with the master processor, wherein the at least one exchange processor includes a ring buffer and a database, the at least one exchange processor storing the one or more market data updates in at least one of the ring buffer and the database prior to transmitting the market data to the master processor that generates the intra-day file and the archival file.

3. The system of claim 2, wherein the at least one exchange processor and the master processor perform an in-memory synchronization processes to synchronize information shared by the at least one exchange processor and the master processor.

4. The system of claim 1, wherein the master processor stores the intra-day file and the archival file in a master database.

5. The system of claim 1, wherein the master processor transmits historical data and incremental data to at least one regional processor, the at least one regional processor storing the historical data and the incremental data in at least one regional database.

6. The system of claim 1, wherein market data updates correspond to a plurality of financial products at different times.

7. The system of claim 6, wherein each of the product fields include market data corresponding to a single financial product.

8. The system of claim 7, wherein to defragment the intra-day file to create the archival file, the master processor is further programmed to sort the market data in time sequence.

9. The system of claim 1, wherein the master processor is further programmed to: generate, during a normalization process, an intra-day streaming data file from the market data updates, the intra-day streaming data file including an exchange identifier field and a plurality of objects associated with the exchange identifier field.

10. The system of claim 9, wherein the normalization process generates an incremental data file and a snapshot data file, the snapshot data file indexed by the incremental data file.

11. The system of claim 10, further comprising at least one regional processor programmed to replay the incremental data file until a time requested by a customer is located.

12. The system of claim 11, wherein the at least one regional processor returns snapshot data from the snapshot data file when the time requested by the customer is located in the incremental data file.

13. The system of claim 11, wherein the at least one regional processor returns matching information to a customer computer system in one or more of a top-of-book or a depth-of-book format.

14. A method, comprising:
   receiving, by a master processor, over a period of time, a plurality of market data updates, each market data update from among the plurality of market data updates comprising a product identifier, a data value of a product identified by the product identifier, and a time value for which the data value relates;
   generating, by the master processor, an intra-day file comprising a plurality of time chunks, each time chunk indexed by time and corresponding to an interval of time;
   assigning, by the master processor, each product identifier, data value, and time value from the market data updates to a respective time chunk based on the time value and the interval of time, wherein the intra-day file is fragmented with respect to a given product because data values for the given product is spread out over multiple time chunks, but the intra-day file is queryable based on a time index of each time chunk; and
   defragmenting, by the master processor, the intra-day file to generate an archival file comprising a plurality of product fields that are indexed by a source of a market data update, wherein each product field from among the plurality of product fields includes a time-series of data values for a respective product, and wherein defragmenting the intra-day file comprises:
      grouping, by the master processor, product identifiers and their respective values from the intra-day file into a time series of data values; and
      assigning, by the master processor, each of the groups into a respective data record.

15. The method of claim 14, further comprising:
   storing, by at least one exchange processor, the one or more market data updates in at least one of a ring buffer and a database prior to transmitting the market data to the master processor that generates the intra-day file and the archival file, wherein the at least one exchange processor is associated with a source of one or more market data updates and is in communication with the master processor.

16. The method of claim 15, further comprising:
performing, by the at least one exchange processor and the master processor, an in- memory synchronization processes to synchronize information shared by the at least one exchange processor and the master processor.

17. The method of claim 14, further comprising:
storing, by the master processor, the intra-day file and the archival file in a master database.

18. The method of claim 14, further comprising:
transmitting, by the master processor, historical data and incremental data to at least one regional processor, the at least one regional processor storing the historical data and the incremental data in at least one regional database.

19. The method of claim 14, wherein market data updates correspond to a plurality of financial products at different times.

20. The method of claim 19, wherein each of the product fields include market data corresponding to a single financial product.

21. The method of claim 20, wherein defragmenting the intra-day file to create the archival file comprises: sorting, by the master processor, the market data in time sequence.

22. The method of claim 14, further comprising:
generating, the master processor during a normalization process, an intra-day streaming data file from the market data updates, the intra-day streaming data file including an exchange identifier field and a plurality of objects associated with the exchange identifier field.

23. The method of claim 22, wherein the normalization process generates an incremental data file and a snapshot data file, the snapshot data file indexed by the incremental data file.

24. The method of claim 23, further comprising:
replaying, by at least one regional processor, the incremental data file until a time requested by a customer is located.

25. The method of claim 24, further comprising:
returning, by the at least one regional processor, snapshot data from the snapshot data file when the time requested by the customer is located in the incremental data file.

26. The method of claim 24, further comprising:
returning, by the at least one regional processor, matching information to a customer computer system in one or more of a top-of-book or a depth-of-book format.

* * * * *